(12) United States Patent
Hayashi

(10) Patent No.: US 10,579,198 B2
(45) Date of Patent: Mar. 3, 2020

(54) INDICATOR DETECTING DEVICE AND SIGNAL PROCESSING METHOD THEREOF

(71) Applicant: Wacom Co., Ltd., Saitama (JP)

(72) Inventor: Toshiyuki Hayashi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/213,782

(22) Filed: Dec. 7, 2018

(65) Prior Publication Data

US 2019/0107904 A1 Apr. 11, 2019

Related U.S. Application Data

(63) Continuation of application No. 15/360,731, filed on Nov. 23, 2016, now Pat. No. 10,152,184, which is a
(Continued)

(30) Foreign Application Priority Data

May 27, 2014 (JP) .................................. 2014-109456

(51) Int. Cl.
*G06F 3/044* (2006.01)
*G06F 3/046* (2006.01)
(Continued)

(52) U.S. Cl.
CPC .......... *G06F 3/044* (2013.01); *G06F 3/03545* (2013.01); *G06F 3/041* (2013.01);
(Continued)

(58) Field of Classification Search
CPC .... G06F 3/044; G06F 3/04883; G06F 3/0416; G06F 3/03545; G06F 3/046; G06F 3/041; G06F 2203/04106
See application file for complete search history.

(56) References Cited

U.S. PATENT DOCUMENTS 9,377,947 B2 6/2016 Sliger
2013/0222238 A1 8/2013 Sliger
(Continued)

FOREIGN PATENT DOCUMENTS

JP 4-127315 A 4/1992
JP 2009-265759 A 11/2009
(Continued)

OTHER PUBLICATIONS

International Search Report, dated Jun. 2, 2015, for International Application No. PCT/JP2015/057988, 2 pages.

*Primary Examiner* — Mark W Regn
(74) *Attorney, Agent, or Firm* — Seed IP Law Group LLP

(57) ABSTRACT

An indicator detecting device that can limit input by an indicator to a partial region within a panel surface is provided. The indicator detecting device includes a sensor having a detecting region for detecting a finger. The sensor outputs an output signal corresponding to a position indicated by the finger in the detecting region. The indicator detecting device includes a position calculating processor that calculates a value indicating the position based on the output signal. The indicator detecting device includes a controller that performs signal processing corresponding to the position based on the calculated value. When a plurality of calculated values indicate that the finger has designated a region within the detecting region, the controller performs different processing of the calculated value indicating a position corresponding to the inside of the designated region than that indicating a position corresponding to the outside of the designated region.

12 Claims, 14 Drawing Sheets

Related U.S. Application Data continuation of application No. PCT/JP2015/057988, filed on Mar. 18, 2015.

(51) Int. Cl.
  *G06F 3/041* (2006.01)
  *G06F 3/0488* (2013.01)
  *G06F 3/0354* (2013.01)

(52) U.S. Cl.
  CPC ............ *G06F 3/046* (2013.01); *G06F 3/0416* (2013.01); *G06F 3/04883* (2013.01); *G06F 2203/04106* (2013.01)

(56) References Cited

U.S. PATENT DOCUMENTS

| | | |
|---|---|---|
| 2013/0300672 A1 | 11/2013 | Griffin |
| 2015/0253982 A1 | 9/2015 | Sliger |

FOREIGN PATENT DOCUMENTS

| | | |
|---|---|---|
| JP | 2011-143557 A | 7/2011 |
| JP | 2012-88805 A | 5/2012 |
| JP | 2013-164710 A | 8/2013 |
| JP | 2013-171544 A | 9/2013 |
| JP | 2013-196283 A | 9/2013 |
| JP | 2013-P30425 * | 9/2013 |
| JP | 2014-21945 A | 2/2014 |

* cited by examiner

F I G . 1
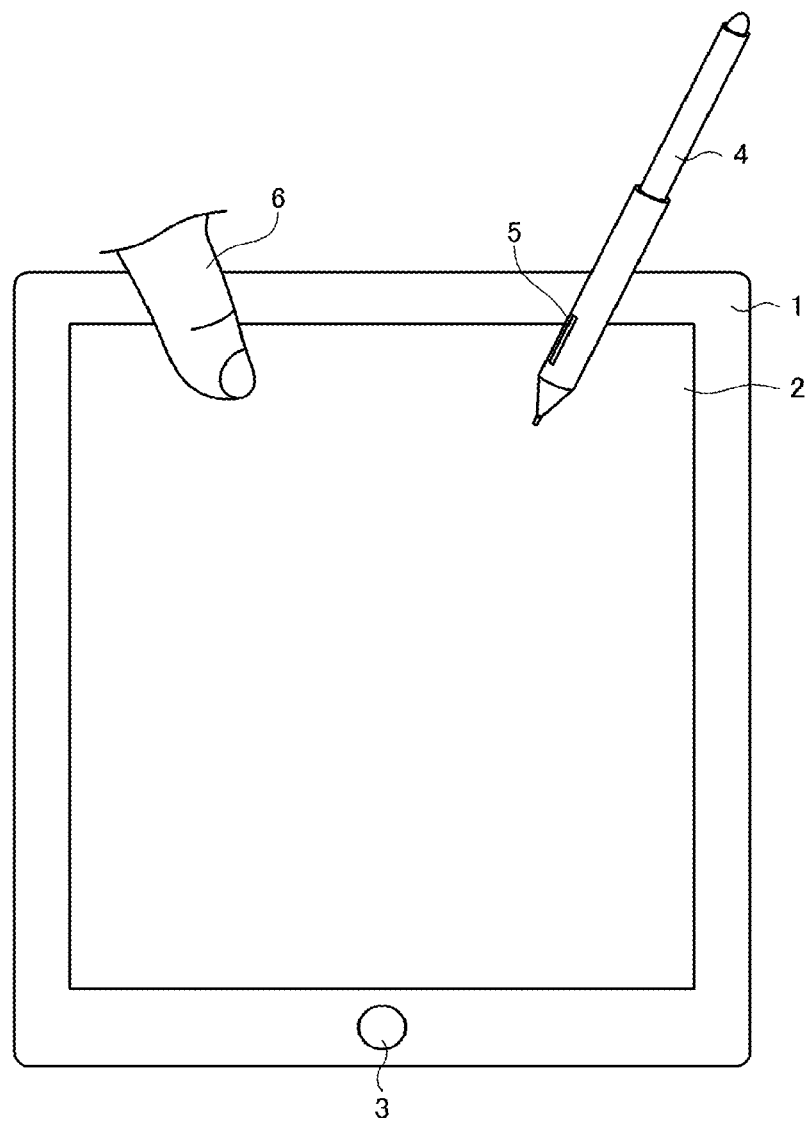

FIG.10

```
TO LIMIT FUNCTIONS OF INPUT TOOL,
MAKE FOLLOWING SELECTIONS AND
PRESS "ENTER."
  1. LIMITATION TARGET REGION
      ⊙ INSIDE OF        ○ OUTSIDE OF
        DESIGNATED REGION  DESIGNATED REGION
  2. LIMITATION TARGET INPUT TOOL
      ○ ELECTRONIC PEN   ⊙ FINGER
     [   ENTER   ]    [   CANCEL   ]
```

INDICATOR DETECTING DEVICE AND SIGNAL PROCESSING METHOD THEREOF

BACKGROUND

Technical Field

The present application relates to an indicator detecting device and a signal processing method, and particularly to an indicator detecting device configured to detect the position of an indicator and a signal processing method of the indicator detecting device.

Background Art

A touch type input system includes an indicator detecting device, which is a plate-shaped input unit, and an indicator such as an electronic pen or a cursor. Some indicator detecting devices may allow a mere stick or a finger of a human to be used as an indicator. Such an input system is generally referred to as a tablet, a digitizer, or the like, and is widely used for a purpose of inputting a character or an illustration on a computer, such as a personal computer or a tablet terminal.

Various kinds of systems, such as a capacitive system and an electromagnetic induction system, are concrete systems of a touch-type input. The capacitive system uses a capacitance occurring between an indicator and each of a plurality of linear conductors arranged in a panel surface. The capacitive system is subdivided into a self-capacitance system that detects a change in voltage in each linear conductor and a mutual capacitance system that detects a change in potential difference between linear conductors intersecting each other. The self-capacitance system is further classified into a system that applies a voltage to the linear conductor on an indicator detecting device side and a system that generates a voltage in the linear conductor by transmitting a signal from the indicator. The former is used in a case where the indicator is a finger or the like that cannot transmit a signal. The latter is used in a case where the indicator can transmit a signal. In the electromagnetic induction system, on the other hand, electromagnetic waves are transmitted and received between an indicator detecting device and an indicator. Specifically, a plurality of loop-shaped conductors are arranged in the panel surface of the indicator detecting device, and the loop-shaped conductors are used as an antenna to transmit and receive electromagnetic waves between the indicator detecting device and the indicator. The transmission and reception in the electromagnetic induction system are performed on a time-division basis.

Such touch type of input systems support input by a plurality of types of indicators (for example, an electronic pen and a finger, a touch pen and a finger, or the like). Patent Documents 1-4 disclose examples of such input systems.

A position detecting device described in Patent Document 1 has a configuration in which an input unit is formed by stacking a first detecting unit corresponding to the capacitive system and a second detecting unit corresponding to the electromagnetic induction system. The position detecting device is configured to alternately perform the measurement of the position of a finger and the detection of an electronic pen by operating the first and second detecting units on a time-division basis when the second detecting unit does not detect the electronic pen (position indicator), and to operate only the second detecting unit to measure the position of the electronic pen when the second detecting unit detects the electronic pen. This realizes electronic pen input by the second detecting unit suitable for the electronic pen when the electronic pen is in proximity to the input unit, and realizes finger input by the first detecting unit when the electronic pen is not in proximity to the input unit.

In addition, Patent Document 2 discloses an electronic pen system that includes a position detecting device corresponding to the mutual capacitance system and a control device configured to be able to communicate with both of the position detecting device and an electronic pen, and which is configured to enable both of electronic pen input and finger input to be performed in parallel by these devices. Patent Document 3 discloses an electronic notebook device configured to determine which of a touch pen and a finger has touched based on the width of a region in which the touch is detected. Patent Document 4 discloses an electronic apparatus that includes a capacitive type touch panel configured to detect only a conductor, such as a finger, and a resistance film type touch panel configured to detect both a conductor, such as a finger, and a nonconductor, such as a touch pen. The electronic apparatus determines that finger input is used when a touch is detected by both of the touch panels and determines that touch pen input is used when a touch is detected by only the resistance film type touch panel.

Some touch type input systems are configured to limit input in a part of a touch panel according to a dominant hand of a user. Patent Document 5 discloses an example of such an input system.

Patent Document 5 discloses a configuration that limits input to a part of a screen surface according to a dominant hand of a user (the part of the screen surface is a lower right part of the screen surface in a case where the user is right-handed) on the basis of a position touched first, in a drawing system having a touch screen configured to detect a touch by a stylus. This configuration can prevent an erroneous input due to the touching of a palm of the hand of the user to the panel surface.

PRIOR ART DOCUMENTS

Patent Documents

Patent Document 1: Japanese Patent Laid-Open No. 2009-265759
Patent Document 2: Japanese Patent Laid-Open No. 2011-143557
Patent Document 3: Japanese Patent Laid-Open No. 2012-088805
Patent Document 4: Japanese Patent Laid-Open No. 2013-164710
Patent Document 5: U.S. Patent Application Publication No. 2013/0300672

SUMMARY

Technical Problem

In a touch type input system, it may be convenient not only to limit input based on a dominant hand of a user but also to limit input by an indicator only in a partial region within a panel surface. For example, when drawing is performed by an electronic pen in an input system supporting electronic pen input and finger input, erroneous input by a finger (or the palm of a hand) can be prevented by limiting finger input within a drawing region. In addition, when a signature is written in a signature space by an electronic pen in an input system supporting electronic pen input, the signature can be prevented from extending off the signature space by limiting the electronic pen input in a region other than the signature space.

It is accordingly one of the objects of the embodiments described herein to provide an indicator detecting device and a signal processing method thereof that can limit input by an indicator only in a partial region within a panel surface.

Technical Solution

According to an embodiment, an indicator detecting device is provided. The indicator detecting device includes a sensor having a detecting region for detecting an indicator. The sensor is configured to output an output signal corresponding to a position indicated by the indicator in the detecting region. The indicator detecting device includes a position calculating processor electrically connected to the sensor, and configured to calculate a calculated value indicating the position indicated by the indicator based on the output signal. The indicator detecting device includes a controller electrically connected to the position calculating processor, and configured to perform signal processing corresponding to the position indicated by the indicator based on the calculated value calculated by the position calculating processor. When a plurality of calculated values calculated by the position calculating processor indicate that the indicator has designated a first designated region within the detecting region, the controller processes the calculated value indicating a position corresponding to an inside of the first designated region differently than the calculated value indicating a position corresponding to an outside of the first designated region.

According to an embodiment, an indicator detecting device includes a first sensor having a first detecting region for detecting a first indicator. The first sensor is configured to output a first output signal corresponding to a position indicated by the first indicator in the first detecting region. The indicator detecting device includes a second sensor having a second detecting region for detecting a second indicator, and configured to output a second output signal corresponding to a position indicated by the second indicator in the second detecting region. The indicator detecting device includes a position calculating processor electrically connected to each of the first sensor and the second sensor, and configured to calculate a first calculated value indicating the position indicated by the first indicator based on the first output signal. The position calculating processor is configured to calculate a second calculated value indicating the position indicated by the second indicator based on the second output signal. The indicator detecting device includes controller electrically connected to the position calculating processor, and configured to perform signal processing corresponding to the respective positions indicated by the first indicator and the second indicator based on the first calculated value and the second calculated value calculated by the position calculating processor. When a plurality of first calculated values calculated by the position calculating processor indicate that the first indicator has designated a first designated region within the first detecting region, the controller processes the first calculated value indicating a position corresponding to an inside of the first designated region differently than it processes the first calculated value indicating a position corresponding to an outside of the first designated region. Or the control processor processes the second calculated value indicating a position corresponding to the inside of the first designated region differently than the controller processes the second calculated value indicating a position corresponding to the outside of the first designated region.

According to yet another embodiment, an indicator detecting device is provided. The indicator detecting device includes a sensor having a detecting region for detecting an indicator, and configured to output an output signal corresponding to a position indicated by the indicator in the detecting region. The indicator detecting device includes a position calculating processor electrically connected to the sensor, and configured to calculate a calculated value indicating the position indicated by the indicator based on the output signal. The indicator detecting device includes a controller electrically connected to the position calculating processor, and configured to perform signal processing corresponding to the position indicated by the indicator based on the calculated value calculated by the position calculating processor. When a first designated region within the detecting region has been designated by the indicator, the controller performs signal processing differently in a case where the position indicated by the indicator is within the first designated region than in a case where the position indicated by the indicator is outside the first designated region.

According to an embodiment, an indicator function limiting method is provided. The method includes detecting that an indicator has performed an operation of indicating a first designated region within a detecting region of a sensor having the detecting region for detecting the indicator. The method includes calculating a value indicating a position indicated by the indicator based on an output signal of the sensor. The method includes performing signal processing corresponding to the position indicated by the indicator based on the calculated value. The method includes performing the signal processing differently between a case where the calculated value indicates a position corresponding to an inside of the first designated region than a case where the calculated value indicates a position corresponding to an outside of the first designated region.

According to an embodiment, a signal processing method of an indicator detecting device is provided. The indicator detecting device includes a first sensor having a first detecting region for detecting a first indicator and a second sensor having a second detecting region for detecting a second indicator. The indicator detecting device is configured to perform signal processing corresponding to respective positions indicated by the first indicator and the second indicator. The signal processing method includes obtaining a first output signal corresponding to the position indicated by the first indicator in the first detecting region. The signal processing method includes obtaining a second output signal corresponding to the position indicated by the second indicator in the second detecting region. The signal processing method includes obtaining a first calculated value based on the first output signal. The signal processing method includes obtaining a second calculated value based on the second output signal. The signal processing method includes determining based on the first calculated value whether or not the first indicator has designated a first designated region within the first detecting region. The signal processing method includes performing signal processing on the first calculated value indicating a position corresponding to an inside of the first designated region differently than on the first calculated value indicating a position corresponding to an outside of the first designated region, or performing signal processing on the second calculated value indicating a position corresponding to the inside of the first designated region differently than the second calculated value indicating a position corresponding to the outside of the first designated region.

According to an embodiment, there is provided a signal processing method of an indicator detecting device. The indicator detecting device includes a sensor having a detecting region for detecting an indicator. The signal processing method includes obtaining an output signal corresponding to a position indicated by the indicator and obtaining a calculated value corresponding to the indicated position based on the output signal. The signal processing method includes determining based on the calculated value whether or not the indicator has designated a first designated region within the detecting region. The signal processing method includes, when determining that the indicator has designated the first designated region, performing different signal processing on the calculated value indicating a position corresponding to an inside of the first designated region than on the calculated value indicating a position corresponding to an outside of the first designated region.

Advantageous Effect

According to the embodiments described herein, it is possible to limit input by an indicator to only a partial region within a panel surface ("inside" or "outside" of the first designated region).

BRIEF DESCRIPTION OF DRAWINGS

FIG. 1 is a diagram showing an external appearance of a touch type input system according to an embodiment.

FIG. 10 is a diagram showing an example of a pop-up screen displayed in step S4 of FIG. 9.

DETAILED DESCRIPTION

Figure 2A:
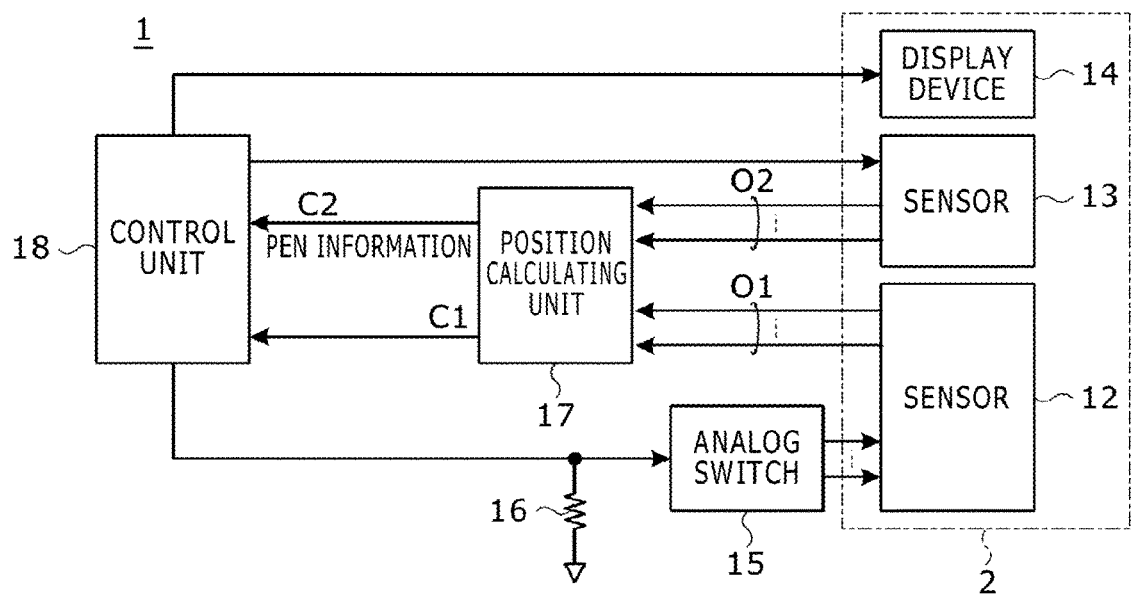
FIG. 2A is a schematic block diagram showing functional blocks of an indicator detecting device according to the embodiment.

FIG. 1 shows a touch type input system according to an embodiment. The touch type input system is formed by an indicator detecting device 1 in the shape of a flat plate. The indicator detecting device has a touch panel 2 and a button 3 on one surface thereof. An electronic pen 4 and a finger 6 are shown as indicators. The electronic pen 4 is a rod-shaped device whose one end is formed so as to be tapered as in a case of a pen tip. The electronic pen 4 has a side switch 5 on a side surface thereof. The finger 6 is generally a finger of a hand of a human.

The indicator detecting device 1 is, for example, a device having a touch type input mechanism of a tablet, a digitizer, a smart phone, or the like. As shown in FIG. 2A, the indicator detecting device 1 further includes an analog switch 15, a current-to-voltage converting unit 16, a position calculating unit 17, and a control unit 18. FIG. 2A does not show the button 3.

Figure 2B:
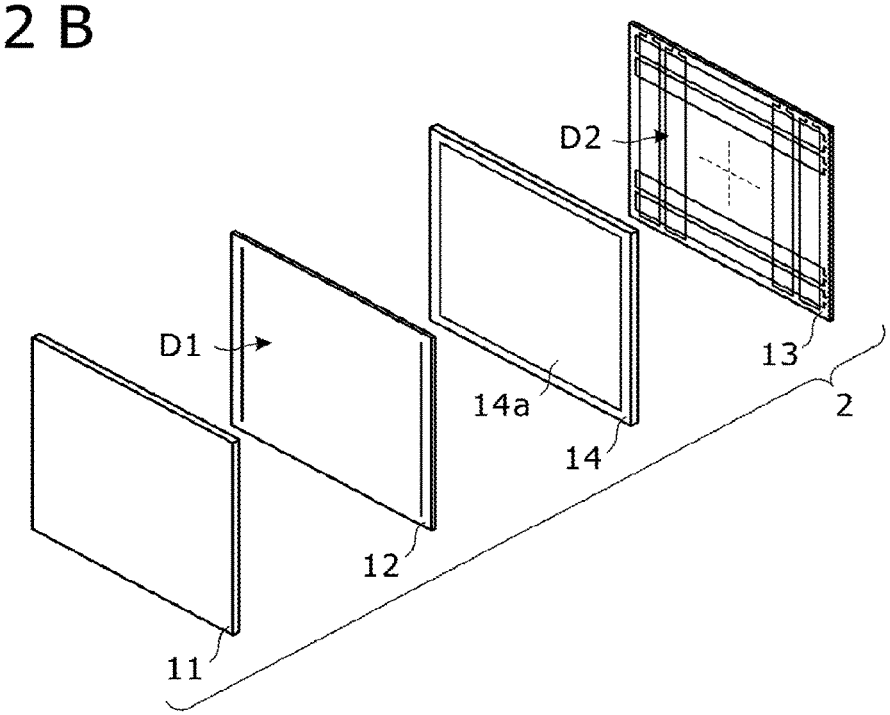
FIG. 2B is an exploded perspective view showing a structure of a touch panel shown in FIG. 2A.

As shown in FIG. 2B, the touch panel 2 includes: a cover 11 as an insulator; a sensor 12 having a detecting region D1 for detecting an indicator; a sensor 13 having a detecting region D2 for detecting an indicator; and a display device 14 having a display region 14a. The cover 11, the sensors 12, 13, and the display device 14 are each formed in the shape of a thin flat plate. As shown in FIG. 2B, the cover 11, the sensor 12, the display device 14, and the sensor 13 are arranged in a stacked manner in this order from the front surface of the indicator detecting device 1 such that the detecting regions D1 and D2 and the display region 14a are superimposed on each other. The display device 14 and the sensor 13 may also be arranged in reverse order.

The front surface of the cover 11 constitutes a flat panel surface. A user of the indicator detecting device 1 inputs a character or a drawing by touching the panel surface and tracing the character or the drawing with the electronic pen 4 or the finger 6.

The sensor 12 detects the finger 6 as an indicator by the capacitive system. The sensor 12 is configured to output an output signal O1 corresponding to a position indicated by the finger 6 in the detecting region D1. On the other hand, the sensor 13 detects the electronic pen 4 as an indicator by an electromagnetic radiation (EMR) system, which may be a type of electromagnetic induction system. The sensor 13 is configured to output an output signal O2 corresponding to a position indicated by the electronic pen 4 in the detecting region D2. Incidentally, suppose that the sensor 12 does not detect the electronic pen 4, and that the sensor 13 does not detect the finger 6. The respective structures of the sensors 12 and 13 are described with reference to FIG. 3 and FIG. 4.

The display device 14 is, for example, a color liquid crystal display. The display device 14 is configured to display an arbitrary character or image in the display region 14a according to a signal from the control unit 18. The cover 11 and the sensors 12 and 13 are each formed so as to be transparent. The user can, therefore, check video displayed in the display region 14a through the panel surface of the cover 11. While the display device 14 is provided in the touch panel 2, the embodiments described herein are also applicable to an indicator detecting device (for example, plate tablet or the like) that does not have a display function.

The position calculating unit 17 is configured to calculate a value C1 indicating a position indicated by an indicator (for example, finger 6) based on the output signal O1 of the sensor 12. The position calculating unit 17 is configured to calculate a value C2 indicating a position indicated by an indicator (for example, electronic pen 4) based on the output signal O2 of the sensor 13. The calculated values C1 and C2 calculated by the position calculating unit 17 are supplied to the control unit 18. With respect to the electronic pen 4, the position calculating unit 17 may further receive pen information including information indicating a state of depression of the side switch 5, a pen pressure, or the like from the electronic pen 4, and supply the pen information to the control unit 18.

The control unit 18 is a processor that operates according to a program stored in a storage device (not shown in the figures). The control unit 18 controls various parts of the indicator detecting device 1 and performs various types of processing. The control unit 18 also inputs and outputs data between the control unit 18 and the storage device (not shown).

More specifically, the control unit 18 is configured to control the sensors 12 and 13 so as to output the output signals O1 and O2. The control unit 18 is configured to perform signal processing corresponding to positions indicated by the electronic pen 4 and the finger 6 based on the calculated values C1 and C2 calculated by the position calculating unit 17 according to the output signals O1 and O2, and the like. The signal processing includes generating a signal for controlling contents displayed on the display device 14 and supplying the signal to the display device 14.

In addition, the control unit 18 is further configured to receive a designation of a region (first designated region) by an indicator by referring to a plurality of calculated values (calculated values C1 or calculated values C2) calculated by the position calculating unit 17. When the designation of the region is received (that is, when the plurality of calculated values indicate that the indicator has designated the region within a corresponding detecting region), the control unit 18 afterward performs signal processing differently on a calculated value indicating a position corresponding to the inside of the designated region than a calculated value indicating a position corresponding to the outside of the designated region.

Here, the calculated values referred to when the designation of the region is received may be the same as or different from the calculated values that are processed differently (i.e., depending on whether the "inside" or the "outside" of a region is designated). That is, the control unit 18 may receive a designation of a region by referring to calculated values C1. The control unit 18 may afterward perform signal processing differently on a calculated value C1 indicating a position corresponding to the inside of the designated region and a calculated value C1 indicating a position corresponding to the outside of the designated region. The control unit 18 may receive a designation of a region by referring to calculated values C2. The control unit 18 may afterward perform signal processing differently on a calculated value C1 indicating a position corresponding to the inside of the designated region and a calculated value C1 indicating a position corresponding to the outside of the designated region. The control unit 18 may receive a designation of a region by referring to calculated values C1. The control unit 18 may afterward perform signal processing differently on a calculated value C2 indicating a position corresponding to the inside of the designated region than a calculated value C2 indicating a position corresponding to the outside of the designated region. The control unit 18 may receive a designation of a region by referring to calculated values C2, and afterward perform signal processing differently on a calculated value C2 indicating a position corresponding to the inside of the designated region and a calculated value C2 indicating a position corresponding to the outside of the designated region. In addition, the control unit 18 may receive a designation of a region by referring to calculated values C1 or calculated values C2, and afterward perform signal processing that differs between a calculated value C1 indicating a position corresponding to the inside of the designated region and a calculated value C1 indicating a position corresponding to the outside of the designated region. The control unit 18 may perform signal processing that differs for a calculated value C2 indicating a position corresponding to the inside of the designated region and for a calculated value C2 indicating a position corresponding to the outside of the designated region.

Further, the control unit 18 may further allow the user to select one of the "inside" and the "outside" of the designated region and select one of the "electronic pen" and the "finger." In this case, if the user selects the "outside" and the "electronic pen," for example, it suffices for the control unit 18 to perform signal processing as usual for a calculated value C1 and a calculated value C2 indicating a position corresponding to the inside of the designated region. The control unit 18 may not perform signal processing for a calculated value C2 indicating a position corresponding to the outside of the designated region. It is thereby possible to provide the user with a user experience such that the electronic pen 4 functions only within the designated region. This point will be described again later by citing more concrete examples with reference to FIGS. 5 to 14.

The current-to-voltage converting unit 16 is a device for converting a current signal supplied from the control unit 18 into a voltage signal. Specifically, as shown in FIG. 2A, the current-to-voltage converting unit 16 is formed by a resistor having one end connected to wiring extending from the control unit 18 to the analog switch 15 and having another end grounded. A voltage signal obtained by the current-to-voltage converting unit 16 is supplied to the sensor 12 via the analog switch 15. In this case, and as described with reference to FIG. 3, the sensor 12 is provided with a plurality of terminals. The analog switch 15 has a function of selectively supplying the voltage signal supplied from the current-to-voltage converting unit 16 to a part of these terminals while selectively supplying a ground potential to another part of the terminals, and further setting the remaining terminals in a floating state.

Configuration and operation of the sensor 12 is described with reference to FIG. 3. Sensors 12A to 12D shown in FIGS. 3A to 3D are each an example of the sensor 12, and can each function individually as the sensor 12.

Figure 3A:
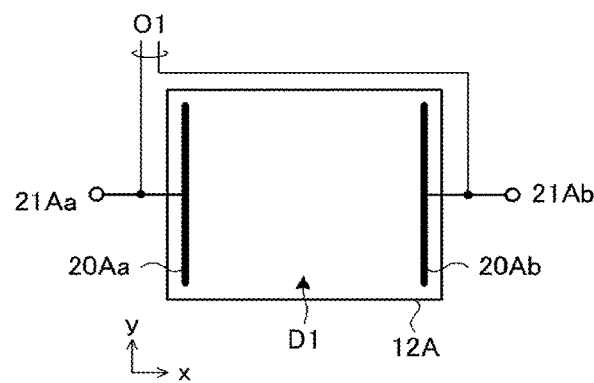
FIG. 3A is a plan view showing an example of a sensor shown in FIG. 2A.

The sensor 12A shown in FIG. 3A has a detecting region D1 disposed in a central portion thereof. The sensor 12A is configured to detect a position indicated by the finger 6 in the detecting region D1 only in an x-direction (longitudinal direction of the rectangular sensor 12A) shown in the figure.

Specifically, as shown in the figure, the sensor 12A includes an electrode 20Aa disposed along one short side of the sensor 12A, an electrode 20Ab disposed along another short side, and terminals 21Aa and 21Ab connected to the electrodes 20Aa and 20Ab, respectively. In the sensor 12A, a region disposed between the electrodes 20Aa and 20Ab forms the detecting region D1. The terminals 21Aa and 21Ab are each connected to the analog switch 15 shown in FIG. 2A. In addition, output signals O1 of the sensor 12A are provided from each of the terminals 21Aa and 21Ab.

The calculation of a value C1 in the case where the sensor 12A is used is performed. First, the control unit 18 controls the analog switch 15 so that the voltage signal output from the current-to-voltage converting unit 16 is supplied to the terminal 21Aa and the ground potential is supplied to the terminal 21Ab. When the control unit 18 further outputs a current signal to the current-to-voltage converting unit 16, the analog switch 15 supplies the voltage signal output from the current-to-voltage converting unit 16 to the terminal 21Aa and supplies the ground potential to the terminal 21Ab. Consequently, in the detecting region D1, a potential slope is formed from the electrode 20Aa to the electrode 20Ab. At this time, when the finger 6 is in a proximity of or in contact with the detecting region D1, a charge moves through the human body, so that a current flows through the terminal 21Aa. This current change is supplied as an output signal O1 to the position calculating unit 17.

Next, the control unit 18 controls the analog switch 15 again so that the voltage signal output from the current-to-voltage converting unit 16 is supplied to the terminal 21Ab and the ground potential is supplied to the terminal 21Aa. When the control unit 18 further outputs a current signal to the current-to-voltage converting unit 16, the analog switch 15 supplies the voltage signal output from the current-to-voltage converting unit 16 to the terminal 21Ab and supplies the ground potential to the terminal 21Aa. Consequently, in the detecting region D1, a potential slope is formed from the electrode 20Ab to the electrode 20Aa. At this time, when the finger 6 is in a proximity of or in contact with the detecting region D1, a charge moves through the human body, so that a current flows through the terminal 21Ab. This current change is supplied as an output signal O1 to the position calculating unit 17.

The position calculating unit 17 calculates a ratio between the current change of the terminal 21Aa and the current change of the terminal 21Ab from the two output signals O1 that are supplied consecutively. The position calculating unit 17 then calculates the x-coordinate of the contact position of the finger 6 (position indicated by the finger 6) within the detecting region D1 from the calculated ratio. The calculated value C1 in the case where the sensor 12A is used is represented by the calculated x-coordinate.

Figure 3B:
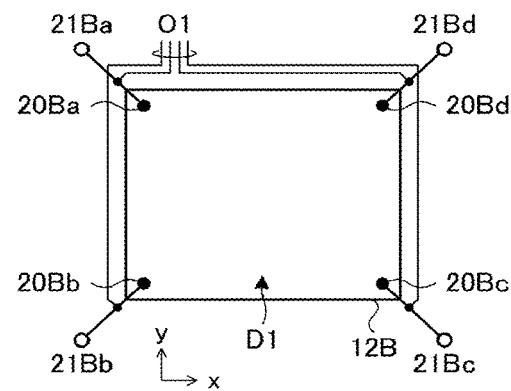
FIG. 3B is a plan view showing an example of the sensor shown in FIG. 2A.

Next, the sensor 12B shown in FIG. 3B has a detecting region D1 disposed in a central portion thereof. The sensor 12B is configured to detect a position indicated by the finger 6 in the detecting region D1 in both of an x-direction (longitudinal direction of the rectangular sensor 12B) and a y-direction (direction orthogonal to the x-direction within the plane of the detecting region D1) shown in the figure.

Specifically, as shown in the figure, the sensor 12B has dot-shaped electrodes 20Ba-20Bd that are arranged counterclockwise at four corners of the sensor 12B. The electrodes 20Ba-20Bd are connected to terminals 21Ba-21Bd, respectively. In the sensor 12B, a rectangular region having the electrodes 20Ba-20Bd as respective vertices forms the detecting region D1. The terminals 21Ba-21Bd are each connected to the analog switch 15 shown in FIG. 2A. In addition, output signals O1 of the sensor 12B are provided from each of the terminals 21Ba to 21Bd.

The calculation of a value C1 in the case where the sensor 12B is used is performed. First, the control unit 18 controls the analog switch 15 so that the voltage signal output from the current-to-voltage converting unit 16 is supplied to the terminals 21Ba, 21Bb and the ground potential is supplied to the terminals 21Bc, 21Bd. When the control unit 18 further outputs a current signal to the current-to-voltage converting unit 16, the analog switch 15 supplies the voltage signal output from the current-to-voltage converting unit 16 to the terminals 21Ba, 21Bb and supplies the ground potential to the terminals 21Bc, 21Bd. Consequently, in the detecting region D1, a potential slope is formed from one end in the x-direction (end portion in which the electrodes 20Ba, 20Bb are arranged) to another end in the x-direction (end portion in which the electrodes 20Bc, 20Bd are arranged). At this time, when the finger 6 is in a proximity of or in contact with the detecting region D1, a charge moves through the human body, so that a current flows through the terminals 21Ba, 21Bb. This current change is supplied as an output signal O1 to the position calculating unit 17.

Next, the control unit 18 controls the analog switch 15 again so that the voltage signal output from the current-to-voltage converting unit 16 is supplied to the terminals 21Bc, 21Bd and the ground potential is supplied to the terminals 21Ba, 21Bb. When the control unit 18 further outputs a current signal to the current-to-voltage converting unit 16, the analog switch 15 supplies the voltage signal output from the current-to-voltage converting unit 16 to the terminals 21Bc, 21Bd and supplies the ground potential to the terminals 21Ba, 21Bb. Consequently, in the detecting region D1, a potential slope is formed from the other end in the x-direction (end portion in which the electrodes 20Bc, 20Bd are arranged) to the one end in the x-direction (end portion in which the electrodes 20Ba, 20Bb are arranged). At this time, when the finger 6 is in a proximity of or in contact with the detecting region D1, a charge moves through the human body, so that a current flows through the terminals 21Bc, 21Bd. This current change is supplied as an output signal O1 to the position calculating unit 17.

The position calculating unit 17 calculates a ratio between the current change of the terminals 21Ba, 21Bb and the current change of the terminals 21Bc, 21Bd from the two output signals O1 that are supplied consecutively. The position calculating unit 17 then calculates the x-coordinate of the contact position of the finger 6 (position indicated by the finger 6) within the detecting region D1 from the calculated ratio.

Next, the control unit 18 controls the analog switch 15 again so that the voltage signal output from the current-to-voltage converting unit 16 is supplied to the terminals 21Ba, 21Bd and the ground potential is supplied to the terminals 21Bb, 21Bc. When the control unit 18 further outputs a current signal to the current-to-voltage converting unit 16, the analog switch 15 supplies the voltage signal output from the current-to-voltage converting unit 16 to the terminals 21Ba, 21Bd and supplies the ground potential to the terminals 21Bb, 21Bc. Consequently, in the detecting region D1, a potential slope is formed from one end in the y-direction (end portion in which the electrodes 20Ba, 20Bd are arranged) to another end in the y-direction (end portion in which the electrodes 20Bb, 20Bc are arranged). At this time, when the finger 6 is in a proximity of or in contact with the detecting region D1, a charge moves through the human body, so that a current flows through the terminals 21Ba, 21Bd. This current change is supplied as an output signal O1 to the position calculating unit 17.

Next, the control unit 18 controls the analog switch 15 again so that the voltage signal output from the current-to-voltage converting unit 16 is supplied to the terminals 21Bb, 21Bc and the ground potential is supplied to the terminals 21Ba, 21Bd. When the control unit 18 further outputs a current signal to the current-to-voltage converting unit 16, the analog switch 15 supplies the voltage signal output from the current-to-voltage converting unit 16 to the terminals 21Bb, 21Bc and supplies the ground potential to the terminals 21Ba, 21Bd. Consequently, in the detecting region D1, a potential slope is formed from the other end in the y-direction (end portion in which the electrodes 20Bb, 20Bc are arranged) to the one end in the y-direction (end portion in which the electrodes 20Ba, 20Bd are arranged). At this time, when the finger 6 is in a proximity of or in contact with the detecting region D1, a charge moves through the human body, so that a current flows through the terminals 21Bb, 21Bc. This current change is supplied as an output signal O1 to the position calculating unit 17.

The position calculating unit 17 calculates a ratio between the current change of the terminals 21Ba, 21Bd and the current change of the terminals 21Bb, 21Bc from the two output signals O1 that are supplied consecutively. The position calculating unit 17 then calculates the y-coordinate of the contact position of the finger 6 (position indicated by the finger 6) within the detecting region D1 from the calculated ratio.

The position calculating unit 17 is configured to calculate the x-coordinate and the y-coordinate sequentially. The calculated value C1 in the case where the sensor 12B is used is represented by the x-coordinate and the y-coordinate that are calculated.

Figure 3C:
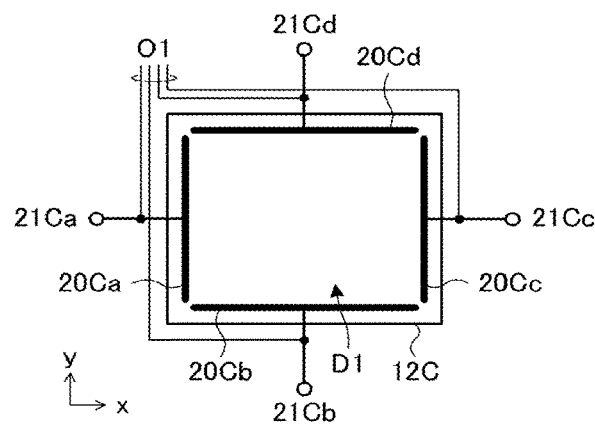
FIG. 3C is a plan view showing an example of the sensor shown in FIG. 2A.

Next, as with the sensor 12B, the sensor 12C shown in FIG. 3C has a detecting region D1 disposed in a central portion thereof, and is configured to detect a position indicated by the finger 6 in the detecting region D1 in both of an x-direction (longitudinal direction of the rectangular sensor 12C) and a y-direction (direction orthogonal to the x-direction within the plane of the detecting region D1) shown in the figure.

Specifically, as shown in the figure, the sensor 12C has a configuration in which linear electrodes 20Ca-20Cd are arranged counterclockwise along each of four sides of the sensor 12C and these electrodes 20Ca-20Cd are connected to terminals 21Ca-21Cd, respectively. In the sensor 12C, a rectangular region enclosed by the electrodes 20Ca-20Cd forms the detecting region D1. The terminals 21Ca-21Cd are each connected to the analog switch 15 shown in FIG. 2A. In addition, output signals O1 of the sensor 12C are provided by each of the terminals 21Ca-21Cd.

The calculation of a value C1 in the case where the sensor 12C is used as the sensor 12 is performed. First, the control unit 18 controls the analog switch 15 so that the voltage signal output from the current-to-voltage converting unit 16 is supplied to the terminal 21Ca, the ground potential is supplied to the terminal 21Cc, and the terminals 21Cb, 21Cd are set in a floating state. When the control unit 18 further outputs a current signal to the current-to-voltage converting unit 16, the analog switch 15 supplies the voltage signal output from the current-to-voltage converting unit 16 to the terminal 21Ca, supplies the ground potential to the terminal 21Cc, and sets the terminals 21Cb, 21Cd in a floating state. Consequently, in the detecting region D1, a potential slope is formed from one end in the x-direction (end portion in which the electrode 20Ca is disposed) to another end in the x-direction (end portion in which the electrode 20Cc is disposed). At this time, when the finger 6 is in a proximity of or in contact with the detecting region D1, a charge moves through the human body, so that a current flows through the terminal 21Ca. This current change is supplied as an output signal O1 to the position calculating unit 17.

Next, the control unit 18 controls the analog switch 15 again so that the voltage signal output from the current-to-voltage converting unit 16 is supplied to the terminal 21Cc, the ground potential is supplied to the terminal 21Ca, and the terminals 21Cb, 21Cd are set in a floating state. When the control unit 18 further outputs a current signal to the current-to-voltage converting unit 16, the analog switch 15 supplies the voltage signal output from the current-to-voltage converting unit 16 to the terminal 21Cc, supplies the ground potential to the terminal 21Ca, and sets the terminals 21Cb, 21Cd in a floating state. Consequently, in the detecting region D1, a potential slope is formed from the other end in the x-direction (end portion in which the electrode 20Cc is disposed) to the one end in the x-direction (end portion in which the electrode 20Ca is disposed). At this time, when the finger 6 is in a proximity of or in contact with the detecting region D1, a charge moves through the human body, so that a current flows through the terminal 21Cc. This current change is supplied as an output signal O1 to the position calculating unit 17.

The position calculating unit 17 calculates a ratio between the current change of the terminal 21Ca and the current change of the terminal 21Cc from the two output signals O1 that are supplied consecutively. The position calculating unit 17 then calculates the x-coordinate of the contact position of the finger 6 (position indicated by the finger 6) within the detecting region D1 from the calculated ratio.

Next, the control unit 18 controls the analog switch 15 again so that the voltage signal output from the current-to-voltage converting unit 16 is supplied to the terminal 21Cb, the ground potential is supplied to the terminal 21Cd, and the terminals 21Ca, 21Cc are set in a floating state. When the control unit 18 outputs a current signal to the current-to-voltage converting unit 16, the analog switch 15 supplies the voltage signal output from the current-to-voltage converting unit 16 to the terminal 21Cb, supplies the ground potential to the terminal 21Cd, and sets the terminals 21Ca and 21Cc in a floating state. Consequently, in the detecting region D1, a potential slope is formed from one end in the y-direction (end portion in which the electrode 20Cb is disposed) to another end in the y-direction (end portion in which the electrode 20Cd is disposed). At this time, when the finger 6 is in a proximity of or in contact with the detecting region D1, a charge moves through the human body, so that a current flows through the terminal 21Cb. This current change is supplied as an output signal O1 to the position calculating unit 17.

Next, the control unit 18 controls the analog switch 15 again so that the voltage signal output from the current-to-voltage converting unit 16 is supplied to the terminal 21Cd, the ground potential is supplied to the terminal 21Cb, and the terminals 21Ca, 21Cc are set in a floating state. When the control unit 18 further outputs a current signal to the current-to-voltage converting unit 16, the analog switch 15 supplies the voltage signal output from the current-to-voltage converting unit 16 to the terminal 21Cd, supplies the ground potential to the terminal 21Cb, and sets the terminals 21Ca, 21Cc in a floating state. Consequently, in the detecting region D1, a potential slope is formed from the other end in the y-direction (end portion in which the electrode 20Cd is disposed) to the one end in the y-direction (end portion in which the electrode 20Cb is disposed). At this time, when the finger 6 is in a proximity of or in contact with the detecting region D1, a charge moves through the human body, so that a current flows through the terminal 21Cd. This current change is supplied as an output signal O1 to the position calculating unit 17.

The position calculating unit 17 calculates a ratio between the current change of the terminal 21Cb and the current change of the terminal 21Cd from the two output signals O1 that are supplied consecutively. The position calculating unit 17 then calculates the y-coordinate of the contact position of the finger 6 (position indicated by the finger 6) within the detecting region D1 from the calculated ratio.

The position calculating unit 17 is configured to calculate the x-coordinate and the y-coordinate sequentially. The calculated value C1 in the case where the sensor 12C is used is represented by the calculated x-coordinate and the y-coordinate.

Figure 3D:
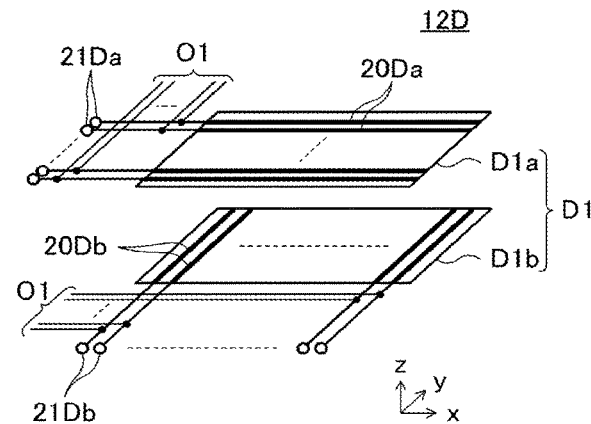
FIG. 3D is a perspective view showing an example of the sensor shown in FIG. 2A.

Next, unlike the sensors 12A-12C, the sensor 12D shown in FIG. 3D has a detecting region D1 formed by two detecting regions D1a and D1b laminated in a z-direction. The sensor 12D is configured to detect a position indicated by the finger 6 in the detecting region D1 in both of an x-direction (direction orthogonal to the z-direction) and a y-direction (direction orthogonal to each of the x-direction and the z-direction) shown in the figure.

Specifically, the sensor 12D has a plurality of electrodes 20Da each extending in the x-direction and arranged at equal intervals in the detecting region D1a. The sensor 12D has a plurality of electrodes 20Db each extending in the y-direction and arranged at equal intervals in the detecting region D1b. According to this configuration, capacitors are formed at points of intersection of the electrodes 20Da and the electrodes 20Db. The sensor 12D has a configuration in which a plurality of capacitors are arranged in the form of a matrix. In addition, the sensor 12D has a plurality of terminals 21Da connected to the respective electrodes 20Da, and has a plurality of terminals 21Db connected to the respective electrodes 20Db. The plurality of terminals 21Da and the plurality of terminals 21Db are each connected to the analog switch 15 (shown in FIG. 2A). Output signals O1 of the sensor 12D are provided from each of the plurality of terminals 21Da, 21Db.

The calculation of a value C1 in the case where the sensor 12D is used is performed. First, the control unit 18 controls the analog switch 15 so that the voltage signal output from the current-to-voltage converting unit 16 is supplied to each terminal 21Da and the ground potential is supplied to each terminal 21Db. When the control unit 18 outputs a current signal to the current-to-voltage converting unit 16, the analog switch 15 supplies the voltage signal output from the current-to-voltage converting unit 16 to each terminal 21Da and supplies the ground potential to each terminal 21Db. At this time, when the finger 6 is in a proximity of or in contact with the detecting region D1, capacitive induction occurring between capacitors and the finger 6 causes a charge stored in a capacitor closer to the finger 6 to have a greater variation.

The position calculating unit 17 detects a variation in charge of each capacitor from a plurality of output signals O1 supplied from the sensor 12D. The position calculating unit 17 then calculates the x-coordinate and the y-coordinate of the contact position of the finger 6 (position indicated by the finger 6) within the detecting region D1 based on the magnitudes of the detected variations. The position calculating unit 17 supplies the x-coordinate and the y-coordinate as a calculated value C1 to the control unit 18. The sensor 12D can detect a plurality of fingers 6 simultaneously. In this case, the position calculating unit 17 calculates a plurality of calculated values C1, and supplies the plurality of calculated values C1 to the control unit 18.

The configurations and operations of the sensor 12 have been described above in four concrete examples. The configuration and operation of the sensor 13 (shown in FIG. 1) is described with reference to FIG. 4.

Figure 4:
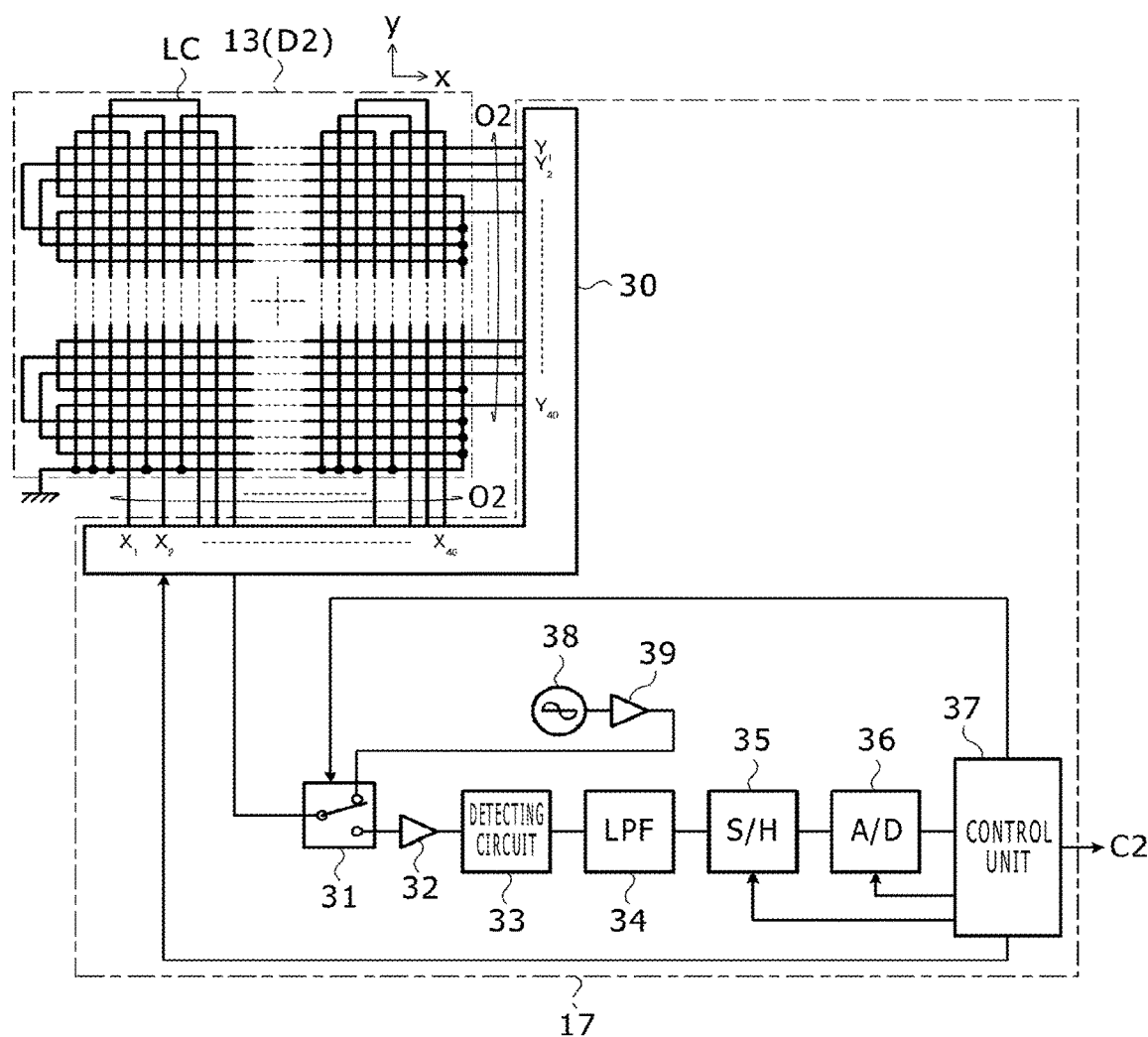
FIG. 4 is a diagram showing an internal configuration of a sensor shown in FIG. 2A.

As shown in FIG. 4, the sensor 13 has a plurality of loop coils (LC) are arranged within the detecting region D2. One end of each loop coil is grounded. Another end of each loop coil is connected to the position calculating unit 17. Output signals O2 of the sensor 13 are provided at the other end of each loop coil that is connected to the position calculating unit 17. FIG. 4 illustrates an example of the plurality of loop coils (forty loop coils $X_1$-$X_{40}$ extending in a y-direction and forty loop coils $Y_1$-$Y_{40}$ extending in an x-direction). The following description is made assuming eighty loop coils ($X_1$-$X_{40}$ and $Y_1$-$Y_{40}$) are used. However, the number of loop coils of the sensor 13 is not limited to eighty.

As shown in FIG. 4, the position calculating unit 17 (used for the sensor 13) includes a selecting circuit 30, a switch circuit 31, an amplifier 32, a detecting circuit 33, a low-pass filter (LPF) 34, a sample and hold circuit (S/H) 35, an analog-to-digital converting circuit (A/D) 36, a control unit 37, an oscillator 38, and a current driver 39.

The selecting circuit 30 is connected to the other end of each loop coil and is supplied with the output signals O2 of the sensor 13. The selecting circuit 30 selects one or more of the loop coils $X_1$-$X_{40}$ and $Y_1$-$Y_{40}$ according to the control of the control unit 37, and connects the selected one or more loop coils to the switch circuit 31.

The switch circuit 31 is formed by a single-pole double-throw switch configured to be switchable according to the control of the control unit 37. The switch circuit 31 has a common terminal connected to the selecting circuit 30, one selecting terminal connected to an input terminal of the amplifier 32, and has another selecting terminal connected to an output terminal of the current driver 39.

The amplifier 32 amplifies a voltage signal supplied from the selecting circuit 30 via the switch circuit 31, and outputs the voltage signal to the detecting circuit 33. The detecting circuit 33 performs envelope detection on the voltage signal output from the amplifier 32, generates an envelope signal, and outputs the envelope signal to the low-pass filter 34. The low-pass filter 34 removes a high-frequency component from the envelope signal generated by the detecting circuit 33. The sample and hold circuit 35 is configured to sample and hold the envelope signal, whose high-frequency component has been removed by the low-pass filter 34, at predetermined time intervals. The analog-to-digital converting circuit 36 generates a digital signal by subjecting the signal held by the sample and hold circuit 35 to analog-to-digital conversion. The analog-to-digital converting circuit 36 outputs the digital signal to the control unit 37.

The control unit 37 is a processor operating according to a program stored in a storage device (not shown). The control unit 37 and the control unit 18 (FIG. 2) may be implemented by a common processor or may be one processor. The control unit 37 controls the selecting circuit 30, the switch circuit 31, the sample and hold circuit 35, and the analog-to-digital converting circuit 36, among other operations. The control unit 37 calculates the value C2 described herein (i.e., value indicating a position indicated by an indicator (electronic pen 4)) based on the digital signal supplied by the analog-to-digital converting circuit 36.

The oscillator 38 is configured to generate an alternating-current signal having a predetermined frequency. The current driver 39 converts the alternating-current signal output from the oscillator 38 into a current signal, and supplies the current signal to the switch circuit 31.

Calculating the value C2 and obtaining pen information are performed as described herein. First, the control unit 37 connects the other selecting terminal (selecting terminal connected to the current driver 39) of the switch circuit 31 to the common terminal, and instructs the selecting circuit 30 to select one of the loop coils $X_1$-$X_{40}$ and $Y_1$-$Y_{40}$. Then, the current signal output from the current driver 39 causes a magnetic field to occur in the selected loop coil. While one loop coil is selected in this case, a total of two loop coils (one loop coil of the loop coils $X_1$-$X_{40}$ and one loop coil of the loop coils $Y_1$-$Y_{40}$) may be selected, for example. In addition, a loop coil dedicated to the generation of a magnetic field may be disposed along the periphery of the detecting region D2 separately from the loop coils $X_1$-$X_{40}$ and $Y_1$-$Y_{40}$. Only the dedicated loop coil may be selected at this stage.

The electronic pen 4 includes a resonance circuit (not shown). The electronic pen 4 is configured to operate using power induced by voltage generated in the resonance circuit when the magnetic field is entered as described above. The operations performed by the electronic pen 4 include transmitting a continuous signal for position detection over a predetermined time and sequentially transmitting a start signal indicating an end of the continuous signal. The electronic pen 4 may transmit pen information.

After a predetermined time has passed from connecting the other selecting terminal of the switch circuit 31 to the common terminal, the control unit 37 connects the one selecting terminal (i.e., selecting terminal connected to the amplifier 32) of the switch circuit 31 to the common terminal. Then, the generation of the magnetic field from the loop coil ends. The electronic pen 4 is configured to start transmitting the continuous signal in this time.

The control unit 37 scans a voltage generated in each of the loop coils $X_1$-$X_{40}$ and $Y_1$-$Y_{40}$ by consecutively changing the loop coil selected by the selecting circuit 30 while the electronic pen 4 is transmitting the continuous signal. The detected voltage is increased as a distance between the loop coil and the electronic pen 4 gets shorter. The control unit 37 can, therefore, calculate a value C2 indicating the position of the electronic pen 4 using a result of the scanning. The control unit 37 calculates the value C2, and outputs the calculated value C2 to the control unit 18.

To shorten the scanning time, the scanning of all of the loop coils and the position detection as described above may be performed only for a first time. In this case, the first position detection is performed with the start signal. The pen information is regarded as the continuous signal while the electronic pen 4 is transmitting the start signal and the pen information. Only loop coils located in the vicinity of a position detected the previous time may be scanned from a second time.

On the other hand, during the time when the electronic pen 4 transmits the pen information, the control unit 37 instructs the selecting circuit 30 to select one of the loop coils according to the detected position of the electronic pen 4. A loop coil closest to the detected position of the electronic pen 4 may be selected. Then, the control unit 37 obtains the pen information transmitted by the electronic pen 4 through the selected loop coil, and outputs the pen information to the control unit 18.

Configuration and operation of the sensor 13 are described herein.

The control unit 18 instructs the sensors 12 and 13 and the position calculating unit 17 to perform the above processing repeatedly while the indicator detecting device 1 is powered. The control unit 18 continues to be constantly supplied with the calculated value C1 indicating the position indicated by the finger 6 at certain time intervals as long as the finger 6 is detected. The control unit 18 continues to be constantly supplied with the calculated value C2 indicating the position indicated by the electronic pen 4 at certain time intervals as long as the electronic pen 4 is detected.

Processing performed by the control unit 18 to limit input by an indicator only in a partial region within the panel surface is described herein. Operation of the indicator detecting device 1 as viewed from the user is first described with reference to FIGS. 5-8. Processing performed by the control unit 18 to realize the operation will then be described with reference to FIGS. 9-14.

Figure 5:
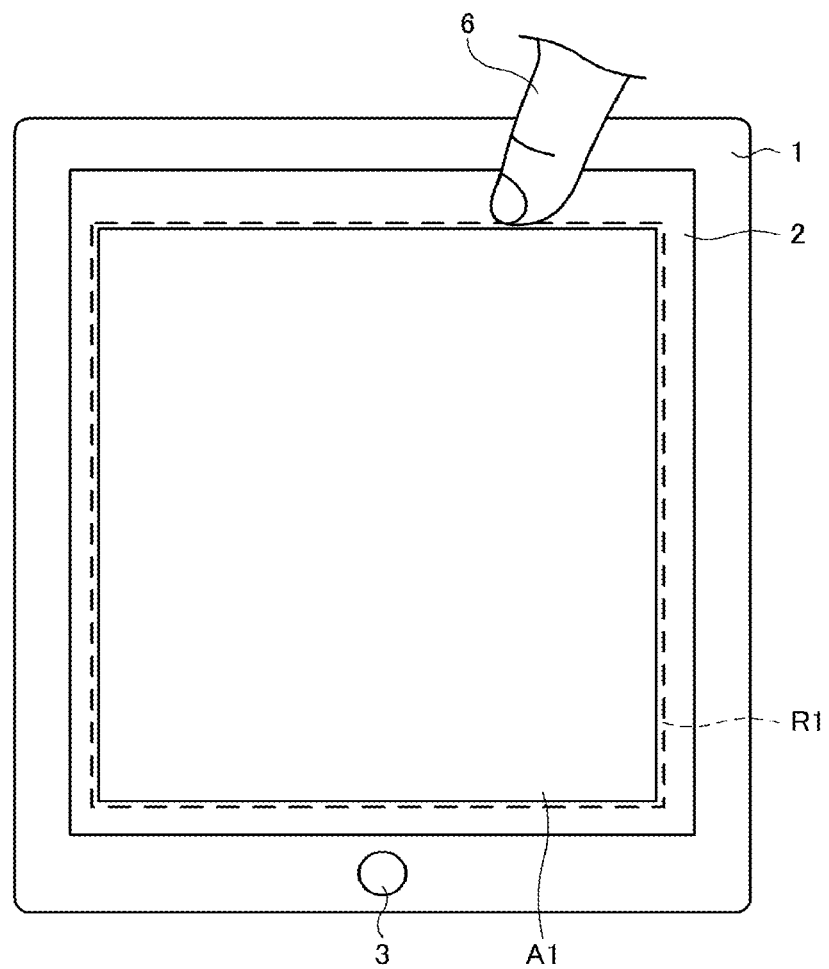
FIG. 5 is a diagram showing an example in which a user has designated a designated region R1 on the touch panel by drawing a rectangle enclosing the periphery of a drawing region A1 using a finger.
Figure 6:
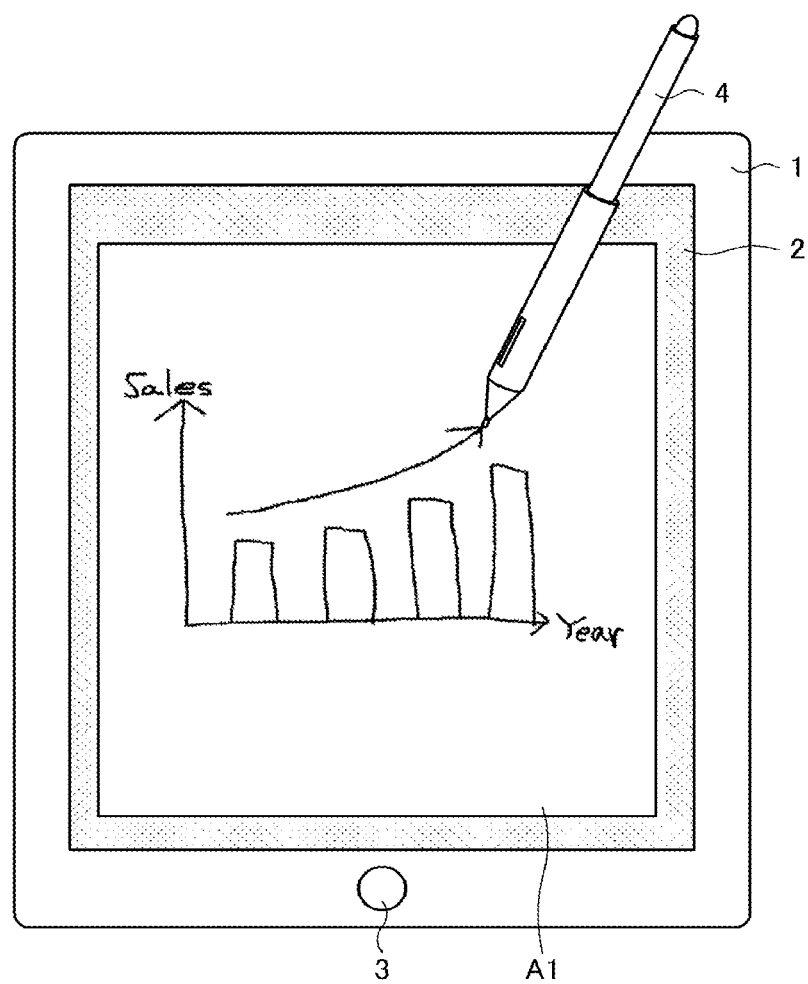
FIG. 6 is a diagram showing an example in which the user is drawing within the drawing region A1 using an electronic pen, with input by the finger limited (e.g., allowed) inside of the designated region R1 shown in FIG. 5.

FIG. 5 and FIG. 6 represent a case where a drawing region A1 is displayed on the touch panel 2 and the user desires to draw a picture with the electronic pen 4 within the drawing region A1. Before the user starts to draw, the user describes a rectangular designated region R1 with the finger 6 or the electronic pen 4 so as to surround the rectangular drawing region A1. Then, a region outside the designated region R1 (the thinly shaded region shown in FIG. 6) and a pop-up screen (as shown in FIG. 10 and described herein) are displayed to inquire of the user about a concrete method of limiting functions of an input tool.

FIG. 6 represents a case where the user selects the "inside of the designated region" as a limitation target region and selects "finger" as a limitation target input tool on the displayed pop-up screen. After the user makes the selections, when the calculated value C1 supplied from the position calculating unit 17 indicates a position within the designated region R1, the control unit 18 performs processing while ignoring the calculated value C1. Even when the finger 6 of the user touches the region within the designated region R1, the touch is entirely ignored. The user can, therefore, enjoy drawing with the electronic pen 4 without being bothered by an erroneous operation caused by the touching of the finger 6.

Figure 7:
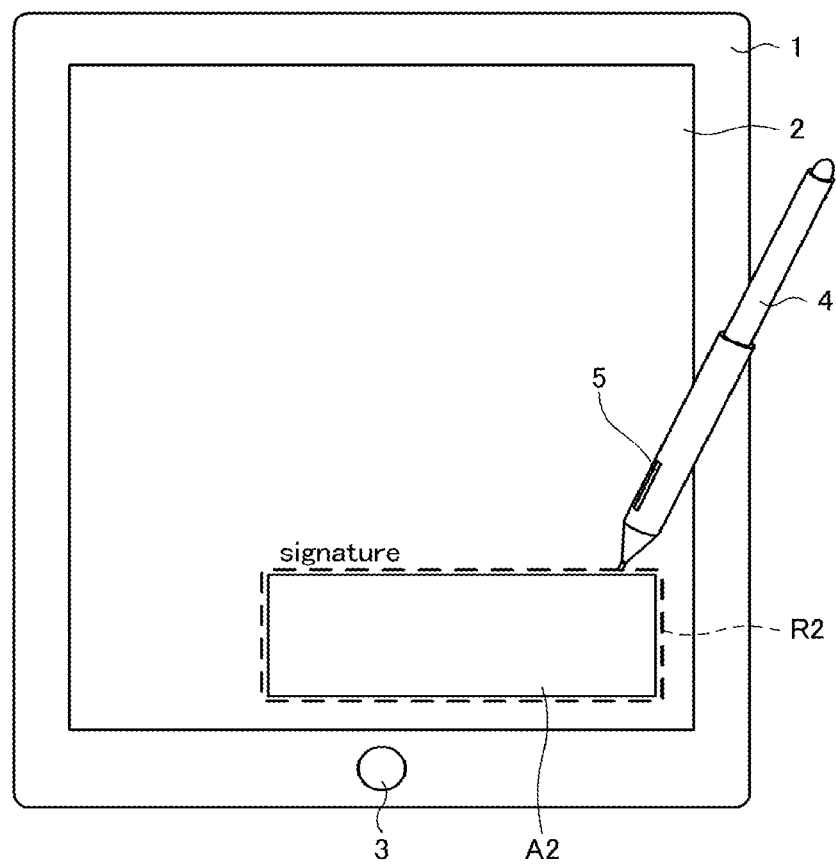
FIG. 7 is a diagram showing an example in which the user has designated a designated region R2 on the touch panel by drawing a rectangle enclosing the periphery of a signature space A2 using the electronic pen.
Figure 8:
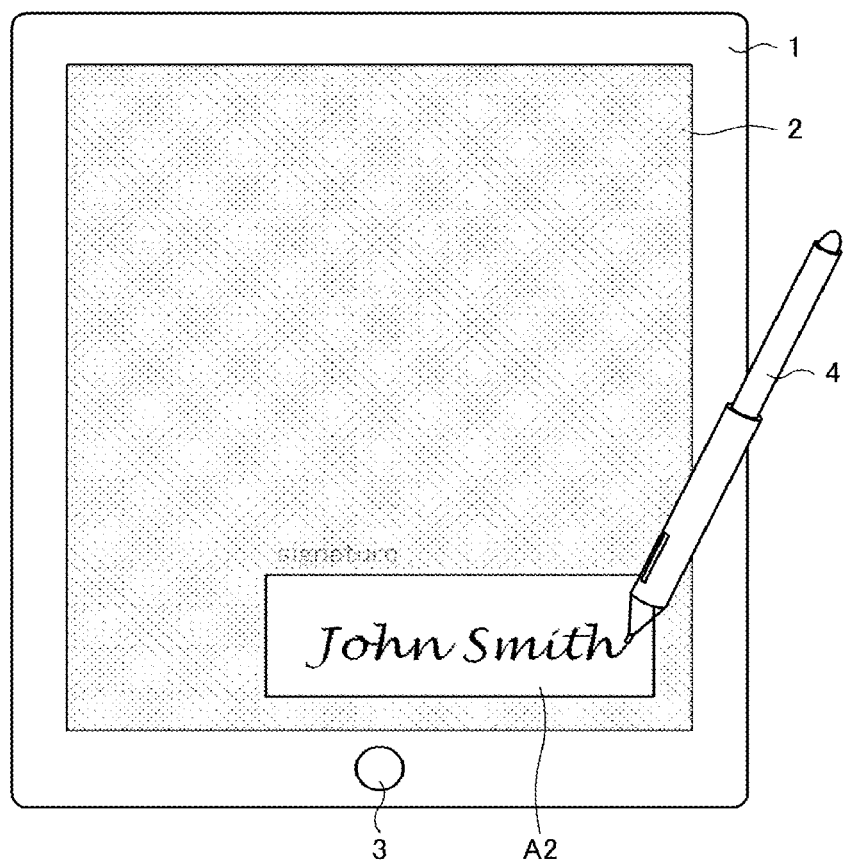
FIG. 8 is a diagram showing an example in which the user writes a signature within the signature space A2 using the electronic pen, with input by the electronic pen being limited (e.g., disallowed) outside of the designated region R2 shown in FIG. 7.

FIG. 7 and FIG. 8 represent a case where a signature space A2 is displayed on the touch panel 2 and the user intends to sign with the electronic pen 4 within the signature space A2. Before the user starts to write a signature, the user describes a rectangular designated region R2 with the finger 6 or the electronic pen 4 so as to surround the rectangular drawing region A1. Then, as shown in FIG. 8, a region outside the designated region R2 is shaded in a manner similar to the example of FIG. 6, and a pop-up screen (as shown in FIG. 10) is displayed to inquire of the user about a concrete method of limiting functions of an input tool.

FIG. 8 represents a case where the user selects the "outside of the designated region" as a limitation target region and selects "electronic pen" as a limitation target input tool on the displayed pop-up screen. After the user makes the selections, when the calculated value C2 supplied from the position calculating unit 17 indicates a position outside the designated region R2, the control unit 18 performs processing while ignoring the calculated value C2. Thus, even when the electronic pen 4 touches the region outside the designated region R2, the touch is entirely ignored. The user can therefore write a signature within the signature space A2 without the signature extending off (outside of) the signature space A2.

Processing performed by the control unit 18 to realize the operation as described above will be described in detail in the following with reference to FIGS. 9 to 14.

Figure 9:
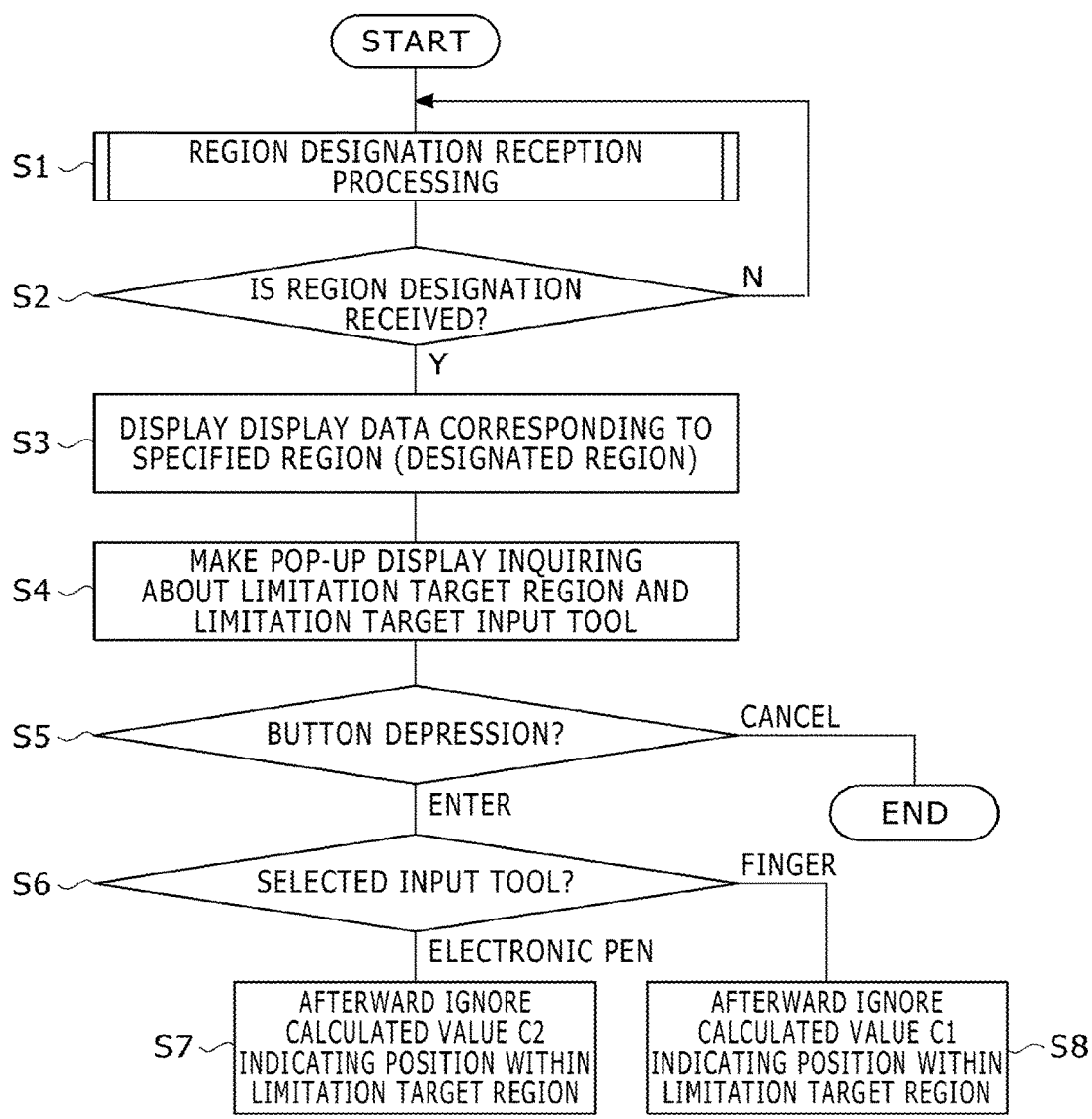
FIG. 9 is a flow diagram of an indicator function limiting method according to an embodiment.
Figure 11:
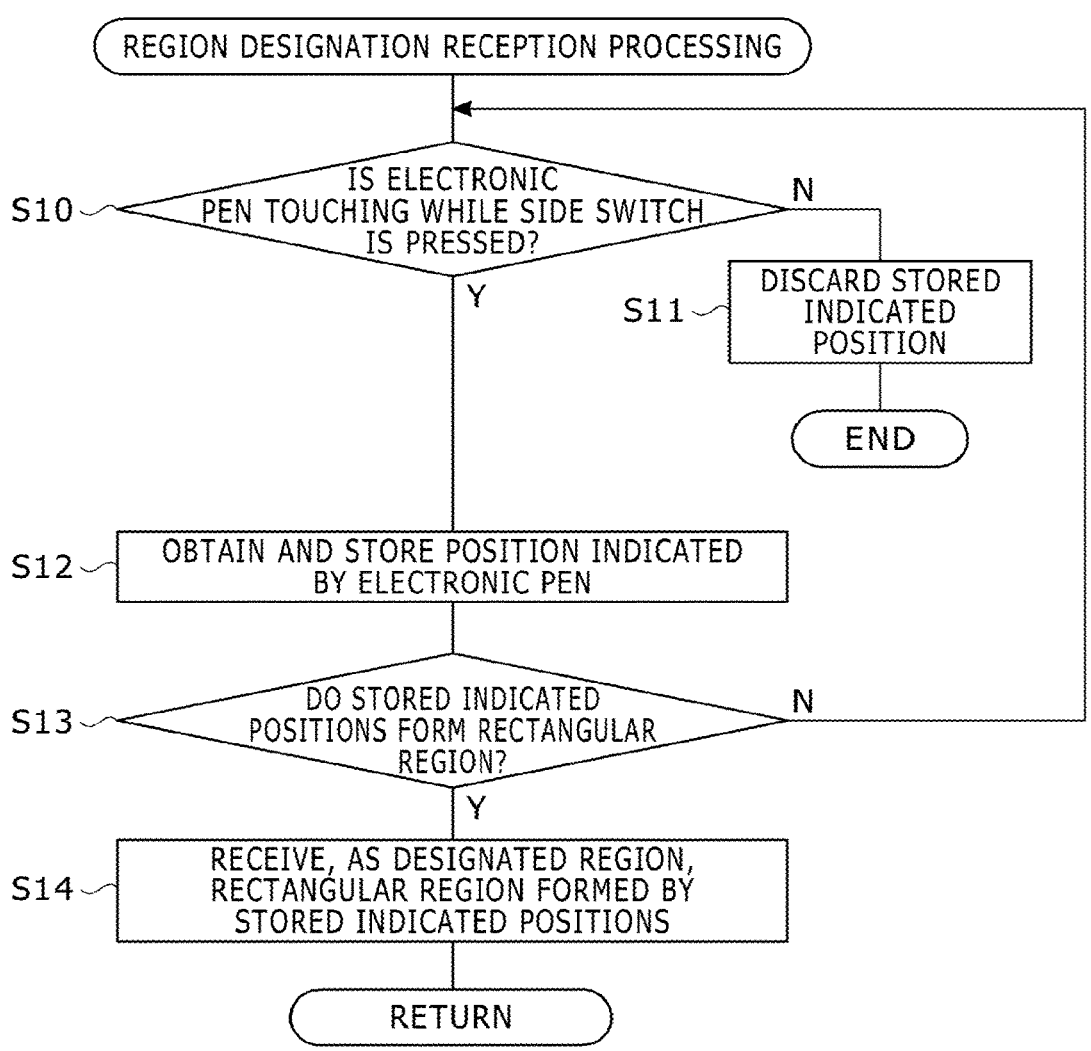
FIG. 11 is a flow diagram of an example of region designation reception processing performed in step S1 of FIG. 9.
Figure 12:
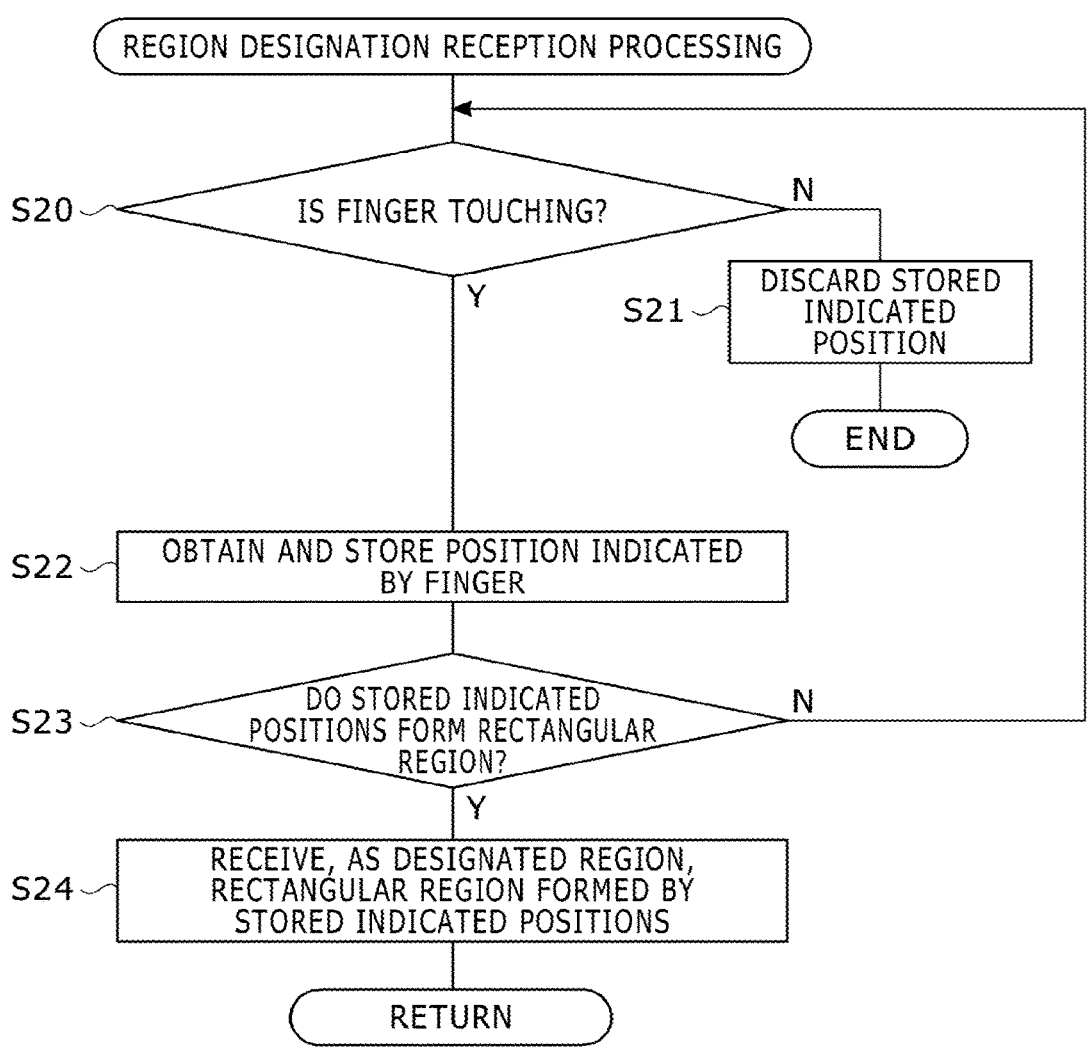
FIG. 12 is a flow diagram of an example of region designation reception processing performed in step S1 of FIG. 9.
Figure 13:
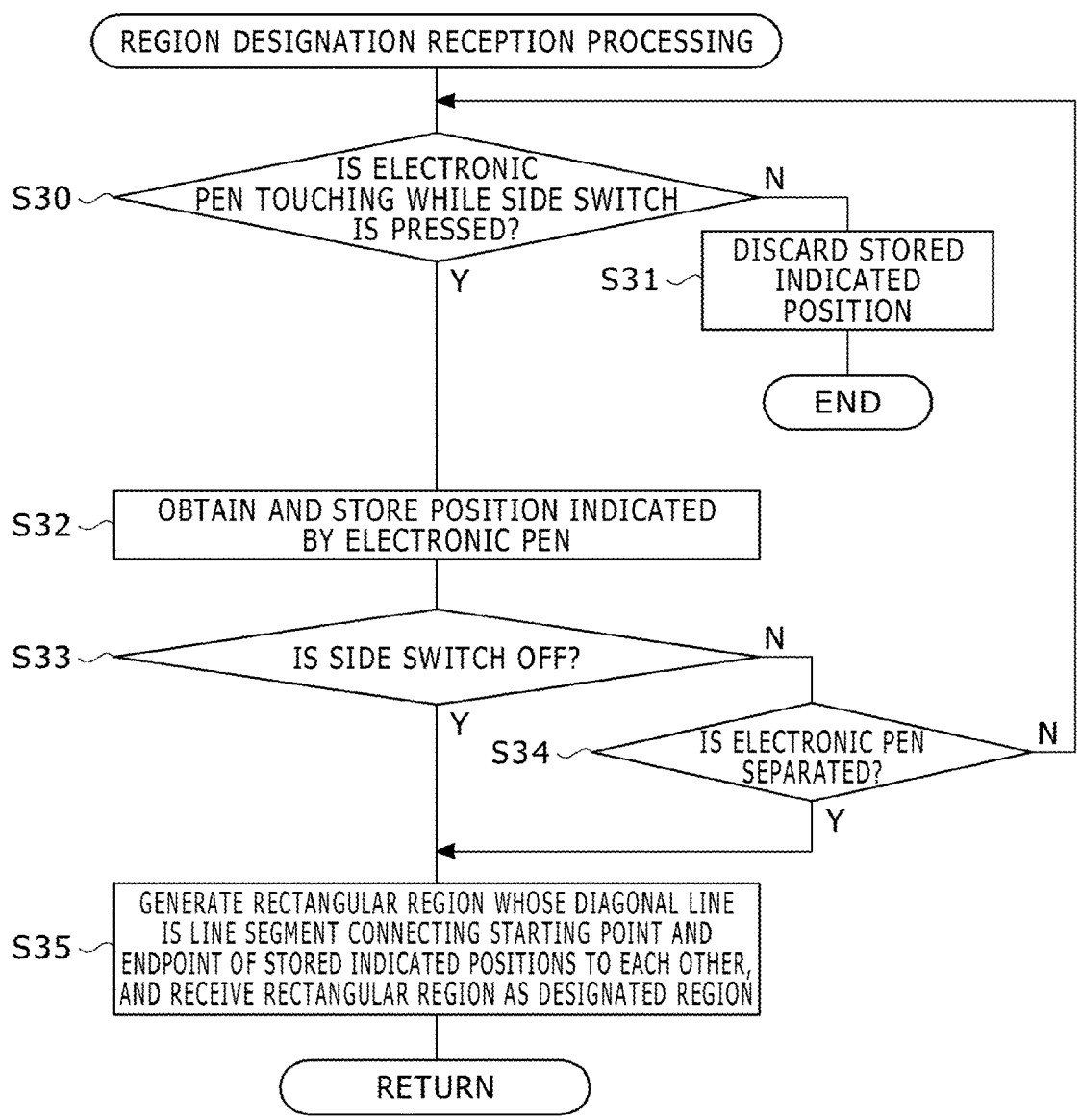
FIG. 13 is a flow diagram of an example of region designation reception processing performed in step S1 of FIG. 9.

FIG. 9 shows a flow diagram for processing performed by the control unit 18. The control unit 18 receives a designation of a region (first designated region) by the user in region designation reception processing (step S1). The control unit 18 detects a predetermined operation performed by the user. Various kinds of operations are conceivable as concrete details of the predetermined operation. FIGS. 11-13 each show an example of the details of the predetermined operation. The following description will therefore be made while sequentially referring to FIGS. 11-13. All of the operations shown in FIGS. 11 to 13 may be performed by the control unit 18 (that is, for example, there may be a plurality of region designating methods). Or only a part of the operations shown in FIGS. 11-13 may be performed by the control unit 18.

FIG. 11 is an example in which designating a designated region is performed by drawing a rectangular region with the electronic pen 4 while pressing the side switch 5. The control unit 18 in the present example first detects whether the user is touching the electronic pen 4 to the panel surface while pressing the side switch 5. The detection is performed based on the calculated value C2 and the pen information supplied from the position calculating unit 17 (step S10). The control unit 18 is configured to store positions indicated by the electronic pen 4 in the storage device (not shown). When a negative determination is made in step S10, the control unit 18 discards the stored indicated positions (step S11). The control unit 18 then ends the processing.

When a positive determination is made in step S10, on the other hand, the control unit 18 obtains a position indicated by the electronic pen 4 at that time from the calculated value C2, and stores the position indicated by the electronic pen 4 in the storage device (step S12). Then, the control unit 18 refers to a series of stored indicated positions, and determines whether or not the indicated positions constitute a rectangular region (step S13). When a result of the determination does not indicate that a rectangular region is formed, the control unit 18 returns to step S10. When a rectangular region is formed, on the other hand, the control unit 18 receives, as a designated region, the rectangular region formed by the series of stored indicated positions. The control unit 18 then proceeds to step S2 in FIG. 9.

FIG. 12 shows an example in which a region is designated by drawing a rectangular region with the finger 6. The control unit 18 in the present example first detects whether the user's finger 6 is touching the panel surface. The detection is performed by based on the calculated value C1 supplied from the position calculating unit 17 (step S20). The control unit 18 is configured to store positions indicated by the finger 6 in the storage device. When a negative determination is made in step S20, the control unit 18 discards stored indicated positions (step S21). The control unit 18 then ends the processing.

When a positive determination in step S20 is made, on the other hand, the control unit 18 obtains a position indicated by the finger 6 at that time from the calculated value C1, and stores the position indicated by the finger 6 in the storage device (step S22). Then, the control unit 18 refers to a series of stored indicated positions, and determines whether or not those indicated positions constitute a rectangular region (step S23). When a result of the determination does not indicate that a rectangular region is formed, the control unit 18 returns to step S20. When a rectangular region is formed, on the other hand, the control unit 18 receives, as a designated region, the rectangular region formed by the series of stored indicated positions (step S24). The control unit 18 then proceeds to step S2 in FIG. 9.

FIG. 13 shows an example in which a region is designated by drawing a line segment with the electronic pen 4 while pressing the side switch 5. The control unit 18 first detects whether the user is touching the panel surface with the electronic pen 4 while pressing the side switch 5. The detection is performed based on the calculated value C2 and the pen information supplied from the position calculating unit 17 (step S30). The control unit 18 is configured to store positions indicated by the electronic pen 4 in the storage device. When a result of the determination in step S30 is negative, the control unit 18 discards stored indicated positions (step S31). The control unit 18 then ends the processing.

When the result of the determination in step S30 is affirmative, on the other hand, the control unit 18 obtains a position indicated by the electronic pen 4 at that time from the calculated value C2, and stores the position indicated by the electronic pen 4 in the storage device (step S32). The control unit 18 next detects whether or not the side switch 5 is off (step S33). When the side switch 5 is not off, the control unit 18 determines whether or not the electronic pen 4 is separated from the touch panel 2 (step S34). When determining in step S34 that the electronic pen 4 is not separated from the touch panel 2, the control unit 18 returns to step S30. When detecting, in step S33, that the side switch 5 is off, or when determining, in step S34, that the electronic pen 4 is separated from the touch panel 2, the control unit 18 generates a rectangular region. The rectangular region has a diagonal line that is a line segment connecting an indicated position among the stored series of indicated positions (corresponding to a starting point) to an indicated position among the stored series of indicated positions (corresponding to an endpoint). The control unit 18 receives the rectangular region as a designated region (step S35). The control unit 18 then proceeds to step S2 in FIG. 9.

Figure 14A:
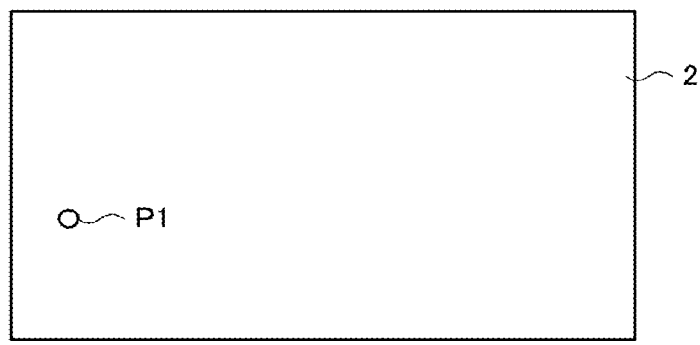
FIGS. 14A and 14B are plan views of a moving state of the electronic pen when region designation reception processing shown in FIG. 13 is performed.
Figure 14B:
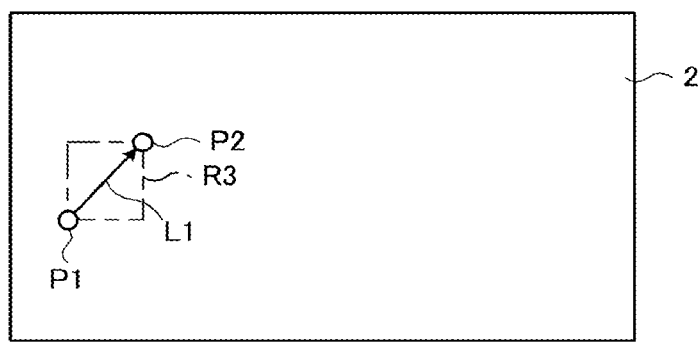

The example of FIG. 13 will be described in more detail with reference to FIG. 14. FIG. 14A shows a state in which the touch of the electronic pen 4 is detected at step 30 in FIG. 13. A position P1 touched in this state is the starting point at step S35. Next, FIG. 14D shows a state in which the turning off of the side switch 5 is detected in step 33 in FIG. 13, or a state in which the separation of the electronic pen 4 is detected in step 34 in FIG. 13. A position P2 (indicated by the electronic pen 4 when the detections are made) is the endpoint in step S35. As shown in FIG. 14B, the control unit 18 sets a line segment L1 connecting the position P1 and the position P2 to each other, and receives a rectangle whose diagonal line is the line segment L1 as a designated region R3.

Referring back to FIG. 9, in region designation reception processing (step S1), the control unit 18 displays data (first display data) corresponding to the designated region (steps S2 and S3). An example of the display data includes the shaded region shown in FIG. 6 and FIG. 8 (translucent shading covering the region other than the designated region). The display of the data enables the user to clearly recognize the region specified by the user. Examples of the display data are not limited to the shading as described above. A straight line image or a broken line image showing edges of the designated region, for example, may be displayed to indicate data.

Next, the control unit 18 invokes a pop-up display inquiring of the user about a limitation target region and a limitation target input tool (step S4). An example of the pop-up display is shown in FIG. 10. As shown in the figure, the pop-up display includes an option button for allowing the user to select one of the "inside of the designated region" and the "outside of the designated region" as a limitation target region. The pop-up display includes an option button for allowing the user to select one of the "electronic pen" and the "finger" as a limitation target input tool. The pop-up display includes an "enter" button, and a "cancel" button. One pop-up display is shown in FIG. 10 that permits the user to select the limitation target region, select the limitation target input tool, and select whether or not to execution execute the selection. Alternative, a plurality of pop-up displays may be used to sequentially allow the user to make the selections one-by-one. The entered data may be used for subsequent processing without inquiring of the user again (i.e., step S4 may be omitted in subsequent processing).

Returning to FIG. 9, when the "cancel" button is depressed on the pop-up screen (i.e., "cancel" determination in step S5), the control unit 18 ends the processing. In this case, input by indicators is not limited. When the "enter" button is depressed on the pop-up screen ("enter" determination in step S5), on the other hand, the control unit 18 determines whether the selected input tool is the "electronic pen" or the "finger" (step S6). When a result of the determination indicates that the selected input tool is the "electronic pen," the control unit 18 thereafter performs signal processing while ignoring the calculated value C2 indicating a position within the limitation target region (step S7). The user thus recognizes that writing on the inside of the limitation target region with the electronic pen 4 cannot be performed. When the selected input tool is the "finger," on the other hand, the control unit 18 thereafter performs signal processing while ignoring the calculated value C1 indicating a position within the limitation target region (step S8). The user thus recognizes that writing on the inside of the limitation target region with the finger 6 cannot be performed.

As described above, the touch type input system and the indicator detecting device 1 according to the present embodiment makes it possible to limit input by an indicator (i.e., the electronic pen 4 or the finger 6) only in a partial region within the panel surface (that is, the "inside" or "outside" of the designated region). In addition, it is possible to select an indicator whose input is to be limited.

The embodiments described herein can of course be carried out in various modes without departing from the spirit of the teachings described herein.

For example, after the control unit 18 processes a calculated value indicating a position corresponding to the inside of the designated region differently from a calculated value indicating a position corresponding to the outside of the designated region, the indicator detecting device 1 may of course be provided with a mechanism for returning the signal processing of the control unit 18 to a normal state. For example, a button image may be displayed within the display region 14a. The signal processing of the control unit 18 may be returned to the normal state based on a trigger, such as the touching of this button image with the finger 6 or the electronic pen 4.

In addition, in the region designation reception processing described with reference to FIG. 11 and FIG. 13, a designated region is received in response to the predetermined operation that the user performs while pressing the side switch 5 of the electronic pen 4. However, another mechanism such as the button 3 of the indicator detecting device 1 (see FIG. 1) can also be used in place of the side switch 5 designate the region.

Furthermore, in addition to the drawing of a rectangle as shown in FIG. 11 and FIG. 12 and the drawing of a line segment as shown in FIG. 13, various kinds of operations for designating a region can be used. For example, a region may be designated by touching using four fingers. Further, a region may be designated by and sliding (an indicator) in the x-direction. For example, it may suffice to set, as a designated region, a region enclosed by a straight line including one endmost position in the x-direction among touched coordinates and extending in the y-direction a straight line including another endmost position in the x-direction among the touched coordinates. Further, the region may be designated by extending in the y-direction a straight line including one endmost position in the y-direction among the touched coordinates and extending in the x-direction a straight line including another endmost position in the y-direction among the touched coordinates and extending in the x-direction. Another operation can be used for designating a region.

A region may be designated without user input. For example, when an operating system or an application makes a predetermined pop-up display (second display data) such as a screen property setting screen in Windows™, a region within the pop-up display may be received as a designated region (second designated region). In this case, the user can perform input to the input area within the pop-up screen by an input method suitable for the contents of the screen displayed in a pop-up manner.

While in an example described herein the sensor 12 is described as a capacitive system and the sensor 13 as an EMR system, different systems can also be used for the respective sensors. For example, the sensor 12 may be a pressure sensitive sensor. In addition, the sensor 13 may be an electromagnetic (EM) sensor. In the EM sensor, a power supply, such as a battery, is provided in the electronic pen and power is not transmitted from the sensor. However, it may be desirable to configure the sensors 12 and 13 such that an indicator as an object for detection by the sensor 12 is not detected by the sensor 13 and an indicator as an object for detection by the sensor 13 is not detected by the sensor 12.

While a case where two sensors 12 and 13 are used is described herein, only one sensor may be used. Use of one sensor may be appropriate in a case where input is performed to the above-described signature space. Use of one sensor may be appropriate in a case where, for example a mouse input is used or a moving image is displayed, and the like. For example, the mouse input may be enabled while input by touch operation is limited on the inside of the designated region (or the outside of the designated region). Further, by limiting input by an indicator within a region in which a moving image is displayed, it is possible to prevent the moving image from being stopped by an erroneous touch.

DESCRIPTION OF REFERENCE SYMBOLS

1 Indicator detecting device
2 Touch panel
3 Button
4 Electronic pen
5 Side switch
6 Finger
11 Cover
12, 13 Sensor
12A First concrete example of the sensor 12
12B Second concrete example of the sensor 12
12C Third concrete example of the sensor 12

12D Fourth concrete example of the sensor 12
14 Display device
14a Display region of the display device 14
15 Analog switch
16 Current-to-voltage converting unit
17 Position calculating unit
18, 37 Control unit
20Aa, 20Ab Electrode of the sensor 12A
20Ba to 20Bd Electrode of the sensor 12B
20Ca to 20Cd Electrode of the sensor 12C
20Da, 20Db Electrode of the sensor 12D
21Aa, 21Ab Terminal of the sensor 12A
21Ba to 21Bd Terminal of the sensor 12B
21Ca to 21Cd Terminal of the sensor 12C
21Da, 21Db Terminal of the sensor 12D
30 Selecting circuit
31 Switch circuit
32 Amplifier
33 Detecting circuit
34 Low-pass filter
35 Sample and hold circuit
36 Analog-to-digital converting circuit
38 Oscillator
39 Current driver
A1 Drawing region
A2 Signature space
C1 Calculated value indicating a position indicated by the finger 6
C2 Calculated value indicating a position indicated by the electronic pen 4
D1 Detecting region of the sensor 12
D1a, D1b Detecting region of the sensor 12D
D2 Detecting region of the sensor 13
L1 Line segment connecting a position P1 and a position P2 to each other
LC, $X_1$ to $X_{40}$, $Y_1$ to $Y_{40}$ Loop coil
O1 Output signal of the sensor 12
O2 Output signal of the sensor 13
P1, P2 Position indicated by the electronic pen 4
R1 to R3 Designated region

The invention claimed is:

1. A position detecting device comprising;
a sensor which, in operation, detects a position of an indicator; and
a controller which, in operation,
determines, based on the position of the indicator detected by the sensor, whether a region is designated, and
sets, when the region is determined to be designated, a processing mode that enables or disables input from the indicator inside or outside of the designated region,
wherein the region is a rectangular region, and
wherein the controller, in operation, generates the rectangular region with a diagonal line segment connecting a starting position among a series of detected positions to an end position among the series of detected positions.

2. The position detecting device according to claim 1 wherein the controller, in operation, controls a display device to display a setup screen when the controller sets of the processing mode that enables or disables input from the indicator inside or outside of the designated region.

3. The position detecting device according to claim 1 wherein the controller, in operation, cancels the position of the indicator detected by the sensor inside or outside of the designated region based on the processing mode that enables or disables input from the indicator inside or outside of the designated region.

4. The position detecting device according to claim 1 wherein the controller, in operation, controls a display device to display inside or outside of the designated region in a different manner when the controller determines the region is designated.

5. The position detecting device according to claim 1 wherein the controller, in operation, sets of a type of indicator to which the processing mode that enables or disables input from the indicator inside or outside of the designated region applies.

6. The position detecting device according to claim 5 wherein the type of indicator is an electronic pen or a finger.

7. A position detecting method comprising;
detecting, by a sensor, a position of an indicator;
determining, based on the position of the indicator detected by the sensor, whether a region is designated, and
setting, when the region is determined to be designated, a processing mode that enables or disables input from the indicator inside or outside of the designated region,
wherein the region is a rectangular region; and
generating the rectangular region with a diagonal line segment connecting a starting position among a series of detected positions to an end position among the series of detected positions.

8. The position detecting method according to claim 7, further comprising:
controlling a display device to display a setup screen during the setting of the processing mode that enables or disables input from the indicator inside or outside of the designated region.

9. The position detecting method according to claim 7, further comprising:
canceling the position of the indicator detected by the sensor inside or outside of the designated region based on the processing mode that enables or disables input from the indicator inside or outside of the designated region.

10. The position detecting method according to claim 7, further comprising:
controlling a display device to display inside or outside of the designated region in a different manner when the controller determines the region is designated.

11. The position detecting method according to claim 7, further comprising:
setting of a type of indicator to which the processing mode that enables or disables input from the indicator inside or outside of the designated region applies.

12. The position detecting method according to claim 11 wherein the type of indicator is an electronic pen or a finger.

* * * * *